US010761190B1

(12) United States Patent
Sykula et al.

(10) Patent No.: US 10,761,190 B1
(45) Date of Patent: Sep. 1, 2020

(54) MOISTURE CONTROL FOR SENSOR ASSEMBLY

(71) Applicants: Ford Global Technologies, LLC, Dearborn, MI (US); Valeo North America, Inc., Troy, MI (US)

(72) Inventors: Andre Sykula, Sterling Heights, MI (US); Segundo Baldovino, Novi, MI (US); Steven Marshall, Auburn Hills, MI (US); Michael Whitney, Auburn Hills, MI (US); Earl Buckman, Auburn Hills, MI (US)

(73) Assignees: FORD GLOBAL TECHNOLOGIES, LLC, Dearborn, MI (US); VALEO NORTH AMERICA, INC., Troy, MI (US)

( * ) Notice: Subject to any disclaimer, the term of this patent is extended or adjusted under 35 U.S.C. 154(b) by 0 days.

(21) Appl. No.: 16/383,494

(22) Filed: Apr. 12, 2019

(51) Int. Cl.
*G01S 7/00* (2006.01)
*G01S 7/481* (2006.01)

(52) U.S. Cl.
CPC ................. *G01S 7/4813* (2013.01)

(58) Field of Classification Search
CPC .............................. G01D 11/245; G01D 11/24
See application file for complete search history.

(56) References Cited

U.S. PATENT DOCUMENTS

| | | | |
|---|---|---|---|
| 3,349,679 A * | 10/1967 | Lohman, III .......... | G03B 15/00 396/427 |
| 4,815,757 A * | 3/1989 | Hamilton ................ | B60R 11/04 182/69.4 |
| 5,034,036 A | 7/1991 | Creek et al. | |
| 5,221,231 A | 6/1993 | Jeckel | |
| 5,342,238 A * | 8/1994 | Segerpalm ............. | B60H 1/262 454/136 |
| 5,406,324 A * | 4/1995 | Roth ...................... | H04N 7/185 348/143 |
| 5,733,190 A * | 3/1998 | Wahab ................... | B60H 1/245 454/162 |
| 6,432,872 B1 * | 8/2002 | Tsushio ................... | B01J 20/26 502/400 |
| 7,138,640 B1 * | 11/2006 | Delgado ................ | G01N 21/15 250/372 |
| 7,197,885 B2 | 4/2007 | Kozak et al. | |
| 7,697,028 B1 * | 4/2010 | Johnson ................... | B60R 1/00 348/113 |
| 7,726,142 B2 * | 6/2010 | Keen .................. | B60H 1/00471 165/202 |

(Continued)

FOREIGN PATENT DOCUMENTS

WO 201721716 A1 12/2017

*Primary Examiner* — Jamel E Williams
(74) *Attorney, Agent, or Firm* — Frank A. MacKenzie; Bejin Bieneman PLC

(57) ABSTRACT

A sensor assembly includes a housing, a blower fixed relative to the housing, an air tunnel, a filter, a first drain, and a second drain. The air tunnel includes an inlet, a first turn, a second turn, a first portion extending upward from the inlet to the first turn, a second portion extending downward from the first turn to the second turn, and a third portion extending from the second turn to the blower. The filter is positioned between the first portion and the first turn. The first drain extends through the first portion. The second drain extends through the third portion.

17 Claims, 5 Drawing Sheets

(56) References Cited

U.S. PATENT DOCUMENTS

| | | | |
|---|---|---|---|
| 7,810,511 B2 * | 10/2010 | Fagrenius | H04N 5/2171 |
| | | | 134/44 |
| 8,663,351 B2 | 3/2014 | Koch | |
| 8,945,285 B2 | 2/2015 | Spryshak | |
| 9,083,864 B2 * | 7/2015 | Reed | G03B 17/02 |
| 10,099,630 B1 * | 10/2018 | Krishnan | E05F 15/443 |
| 10,166,949 B1 * | 1/2019 | Selim | B60R 25/102 |
| 10,430,833 B2 * | 10/2019 | Newman | B60W 50/0098 |
| 10,514,303 B2 * | 12/2019 | Krishnan | G01K 1/08 |
| 10,589,723 B1 * | 3/2020 | Dubey | B60S 1/0844 |
| 10,597,002 B1 * | 3/2020 | Baldovino | B60S 1/0833 |
| 2002/0113875 A1 * | 8/2002 | Mazzilli | G07C 5/0891 |
| | | | 348/148 |
| 2006/0064991 A1 | 3/2006 | Kozak et al. | |
| 2006/0130509 A1 | 6/2006 | Williams et al. | |
| 2012/0162428 A1 * | 6/2012 | Wee | B60R 11/04 |
| | | | 348/148 |
| 2016/0272165 A1 | 9/2016 | Hsiao et al. | |
| 2017/0232823 A1 * | 8/2017 | Lofvendahl | B60H 1/28 |
| | | | 96/55 |
| 2017/0259789 A1 * | 9/2017 | McAndrew | B60S 1/56 |
| 2018/0015907 A1 | 1/2018 | Rice | |
| 2018/0015908 A1 | 1/2018 | Rice | |
| 2019/0310470 A1 * | 10/2019 | Weindorf | B60R 11/04 |
| 2020/0101905 A1 * | 4/2020 | Taylor | B60R 11/04 |

* cited by examiner

MOISTURE CONTROL FOR SENSOR ASSEMBLY

BACKGROUND

Vehicles, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices. Sensor operation can be affected by moisture, e.g., a sensor in an environment that is too wet or humid may not operate properly.

DETAILED DESCRIPTION

Figure 1:
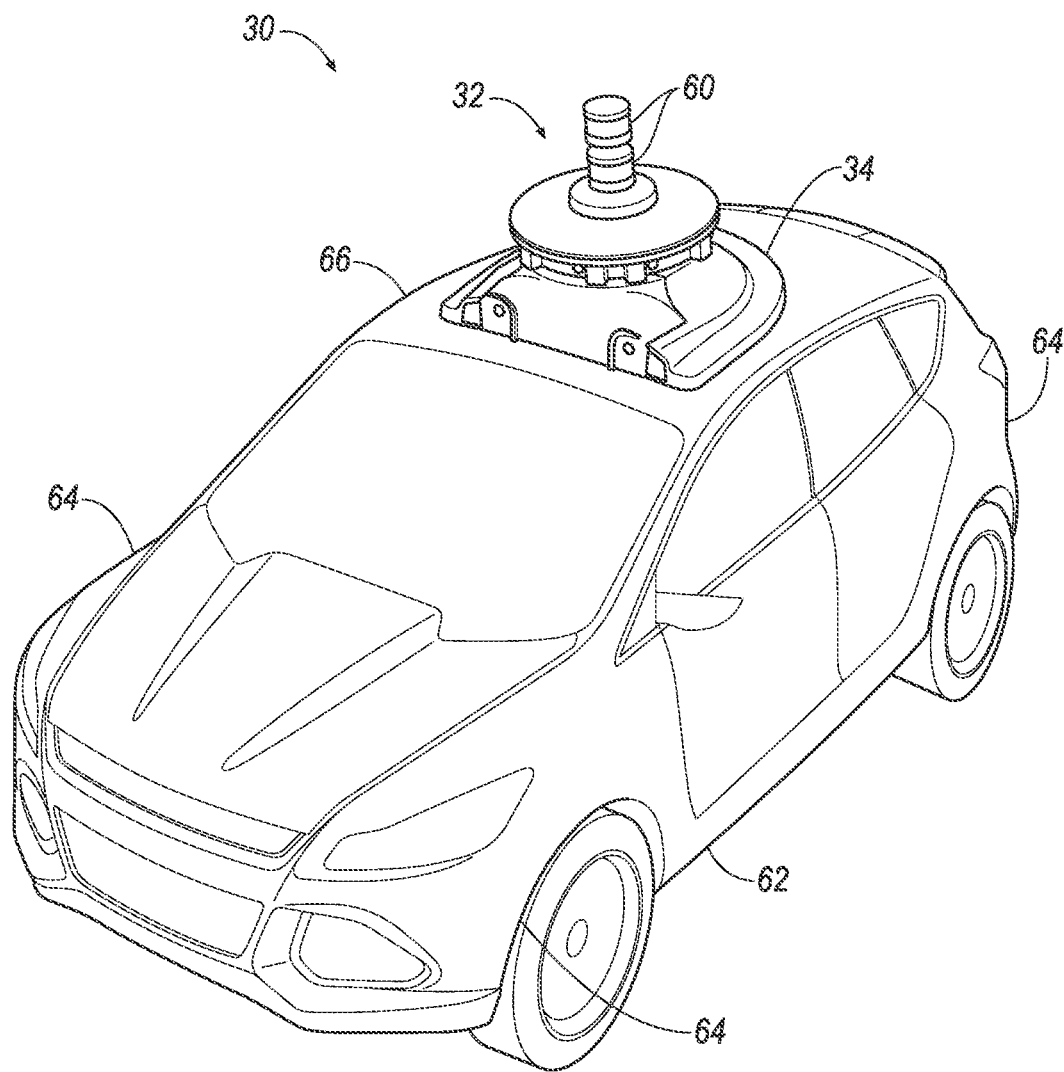
FIG. 1 is a perspective view of an example vehicle including a sensor assembly.

A sensor assembly includes a housing; a blower fixed relative to the housing; an air tunnel including an inlet, a first turn, a second turn, a first portion extending upward from the inlet to the first turn, a second portion extending downward from the first turn to the second turn, and a third portion extending from the second turn to the blower; a filter positioned between the first portion and the first turn; a first drain extending through the first portion; and a second drain extending through the third portion.

The blower may be positioned above the third portion.

The sensor assembly may further include a sensor disposed in the housing and positioned to receive airflow from the blower.

The air tunnel may include a wall partially constituting the first portion and partially constituting the second portion. The first drain may be positioned to receive runoff from the wall.

The third portion may include a floor extending from the second turn to a rear edge, and the second drain may be positioned at the rear edge. The floor may slope downward from the second turn to the rear edge.

The blower may be positioned to draw air vertically upward through the blower.

The air tunnel may be sealed from the inlet to the blower except for the first and second drains.

The filter may be positioned above the inlet.

An airflow direction at the filter may be at least 45° from an airflow direction at the inlet.

An airflow direction exiting the first turn may be greater than 90° from an airflow direction entering the first turn.

An airflow direction exiting the second turn may be at least 45° from an airflow direction entering the second turn.

The blower may include a third drain positioned to drain from an interior of the blower into the third portion.

The air tunnel may be disposed inside the housing.

The inlet may be open to an external environment.

The filter may include hydrophobic fabric.

A sensor assembly 32 for a vehicle 30 includes a housing 34, a blower 36 fixed relative to the housing 34, an air tunnel 38, a filter 40, a first drain 42, and a second drain 44. The air tunnel 38 includes an inlet 46, a first turn 48, a second turn 50, a first portion 52 extending upward from the inlet 46 to the first turn 48, a second portion 54 extending downward from the first turn 48 to the second turn 50, and a third portion 56 extending from the second turn 50 to the blower 36. The filter 40 is positioned between the first portion 52 and the first turn 48. The first drain 42 extends through the first portion 52. The second drain 44 extends through the third portion 56.

The sensor assembly 32 can provide airflow to sensors 58, which can cool the sensors 58 and help ensure continued operability of the sensors 58. The sensor assembly 32 can also prevent rain or moisture in the air outside the housing 34 from reaching the sensors 58 by catching the rain or moisture at multiple locations in the air tunnel 38, e.g., the first portion 52 and the third portion 56, and draining the collected water through the first drain 42 and second drain 44.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A computer can be programmed to operate the vehicle 30 independently of the intervention of a human driver, completely or to a lesser degree. The computer may be programmed to operate the propulsion, brake system, steering, and/or other vehicle systems based at least in part on data received from sensors 58, 60. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

The vehicle 30 includes a body 62. The vehicle 30 may be of a unibody construction, in which a frame and the body 62 of the vehicle 30 are a single component. The vehicle 30 may, alternatively, be of a body-on-frame construction, in which the frame supports the body 62 that is a separate component from the frame. The frame and body 62 may be formed of any suitable material, for example, steel, aluminum, etc.

The body 62 includes body panels 64, 66 partially defining an exterior of the vehicle 30. The body panels 64, 66 may present a class-A surface, e.g., a finished surface exposed to view by a customer and free of unaesthetic blemishes and defects. The body panels 64, 66 include, e.g., a roof 66, etc.

Figure 2:
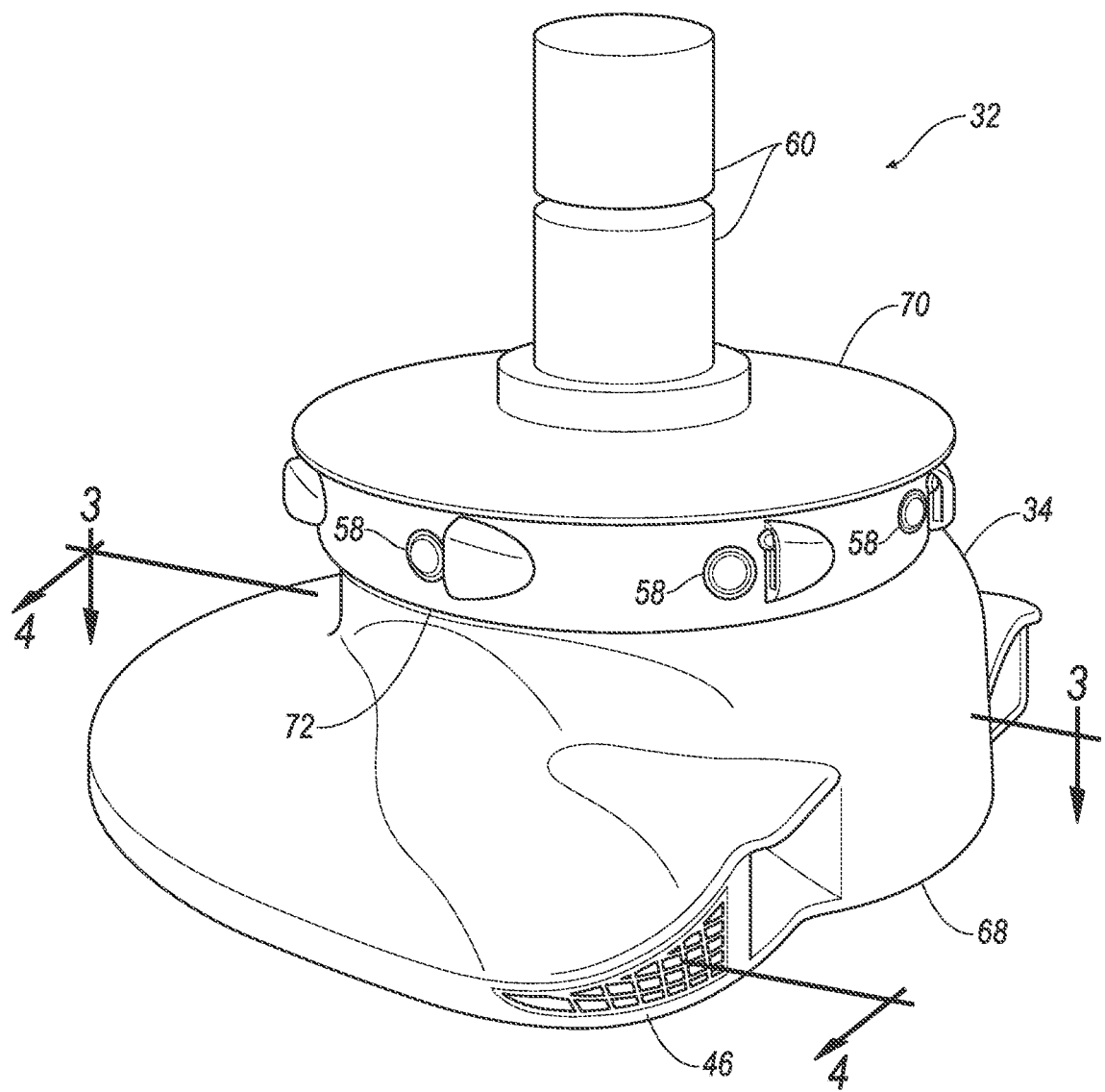
FIG. 2 is a perspective view of the sensor assembly.

With reference to FIG. 2, the housing 34 for the sensors 58 is attachable to the vehicle 30, e.g., to one of the body panels 64, 66 of the vehicle 30, e.g., the roof 66. For example, the housing 34 may be shaped to be attachable to the roof 66, e.g., may have a shape matching a contour of the roof 66. The housing 34 may be attached to the roof 66, which can provide the sensors 58 with an unobstructed field of view of an area around the vehicle 30. The housing 34 may include a forward-facing panel 68, i.e., a panel facing forward relative to the vehicle 30 when the housing 34 is attached to, e.g., the roof 66, as well as a top panel 70 and other side panels 72. The housing 34 may be formed of, e.g., plastic or metal.

Figure 3:
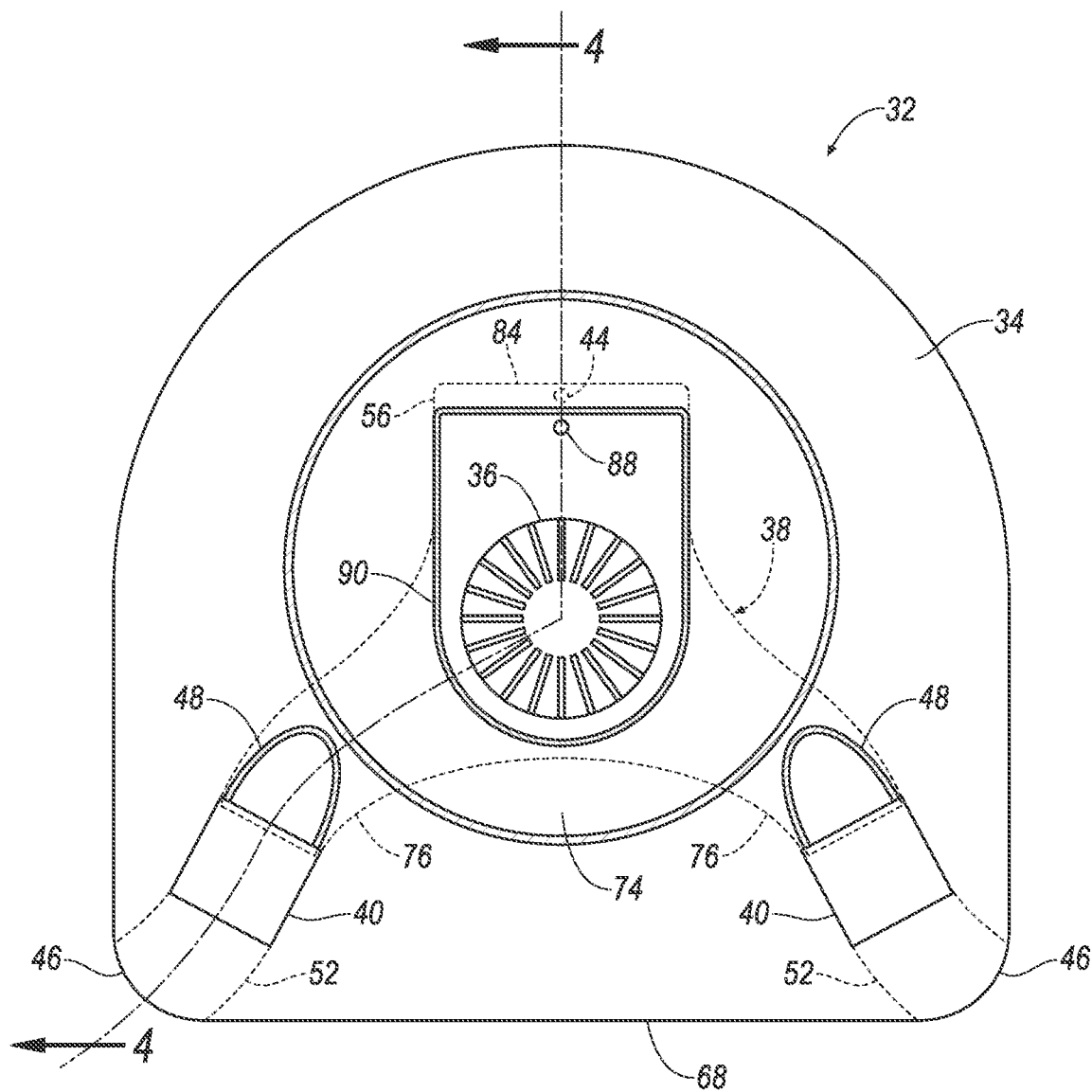
FIG. 3 is a cross-sectional top view of the sensor assembly through line 3-3 in FIG. 2.
Figure 4:
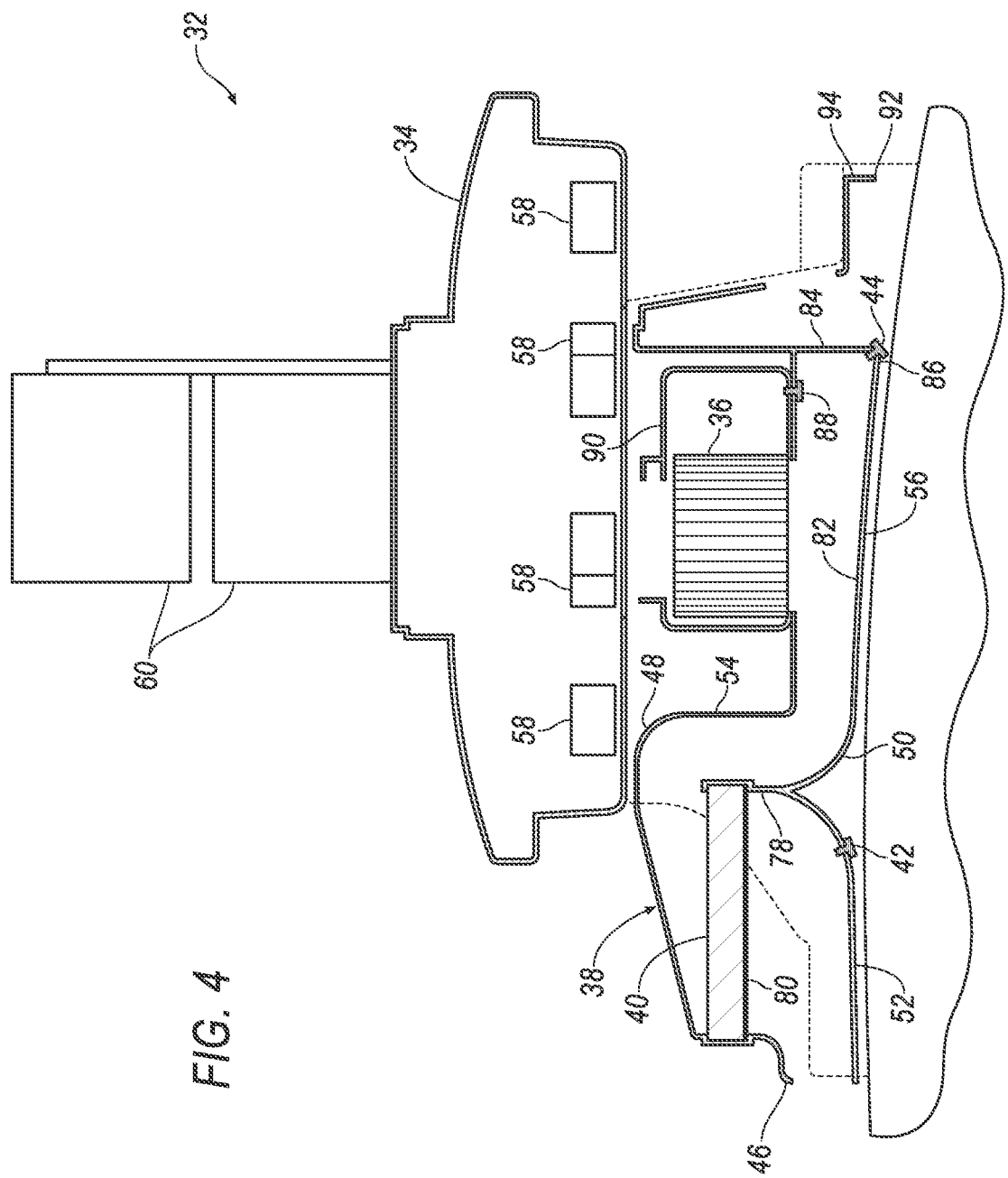
FIG. 4 is a cross-sectional side view of the sensor assembly through line 4-4 in FIGS. 2 and 3.

With reference to FIGS. 3 and 4, the housing 34 may enclose and define a cavity 74; for example, the top panel 70 and side panels 72 may enclose and define the cavity 74. One or more of the body panels 64, 66, e.g., the roof 66, may partially define the cavity 74, or the housing 34 may define a bottom of the cavity 74 (not shown) as well as the top panel 70 enclosing the cavity 74. The housing 34 may shield contents of the cavity 74 from external elements such as wind, rain, debris, etc.

The sensor assembly 32 includes the sensors 58, 60. The sensors 58, 60 may detect the location and/or orientation of the vehicle 30. For example, the sensors 58, 60 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 58, 60 may detect the external world, e.g., objects and/or characteristics of surroundings of the vehicle 30, such as other vehicles, road lane markings, traffic lights and/or signs, pedestrians, etc. For example, the sensors 58, 60 may include radar sensors, scanning laser range finders, light detection and ranging (LIDAR) devices, and image processing sensors such as cameras. The sensors 58, 60 may include communications devices, for example, vehicle-to-infrastructure (V2I) or vehicle-to-vehicle (V2V) devices.

The sensors 58, 60 can include sensors 58 that are disposed in the housing 34 and sensors 60 that are exposed outside the housing 34. In particular, the sensors 58 disposed in the housing 34 may be cameras arranged to collectively cover a 360° horizontal field of view, and the sensors 60 disposed outside the housing 34 may be LIDAR devices. The cavity 74 contains the sensors 58 disposed in the housing 34. The sensors 58 may be attached directly to the roof 66 in the cavity 74, or the sensors 58 may be attached to the housing 34 in the cavity 74, which in turn is directly attached to the roof 66. The sensors 60 are disposed above the housing 34 to have an unobstructed 360° horizontal field of view. The sensors 58 inside the housing 34 receive airflow from the air tunnel 38 by virtue of being disposed in the cavity 74 as described below, and the sensors 60 above the housing 34 may receive airflow from the air tunnel 38 via, e.g., vents through the housing 34 (not shown).

The air tunnel 38 is disposed inside and passes through the housing 34. In particular, the air tunnel 38 is formed of a series of ductwork permitting an airflow path therethrough. The air tunnel 38 may pass through the cavity 74, or the air tunnel 38 may be separated from the cavity 74, i.e., pass through an area walled off from the cavity 74 (not shown). The air tunnel 38 includes one or more inlets 46, one or more first turns 48, one or more second turns 50, one or more first portions 52 each extending from the respective inlet 46 to the respective first turn 48, one or more second portions 54 each extending downward from the respective first turn 48 to the respective second turn 50, and one or more third portions 56 each extending from the respective second turn 50 to the blower 36. The air tunnel 38 is sealed from the inlet 46 to the blower 36 except for the first drain 42 and the second drain 44; i.e., along the air tunnel 38 between the inlet 46 and the blower 36, the first drain 42 and the second drain 44 are the only routes for fluid to flow into or out of the air tunnel 38.

With reference to FIG. 3, the air tunnel 38 may include multiple branches 76, e.g., two branches 76. The branches 76 may duplicate the components of the air tunnel 38 included in the branches 76. For example, the air tunnel 38 may include two inlets 46, two first portions 52, two filters 40, two first turns 48, two second portions 54, two second turns 50, and one third portion 56, and each branch 76 may include one of the inlets 46, one of the first portions 52, one of the filters 40, one of the first turns 48, one of the second portions 54, and one of the second turns 50, and the branches 76 may meet at the third portion 56.

With reference to FIG. 4, the inlets 46 are open to the external environment, i.e., to outside the housing 34. The inlets 46 may be located between the forward-facing panel 68 and the respective side panels 72, as best seen in FIG. 2.

The first portions 52 extend upward from the respective inlet 46 to the respective first turn 48. Each first portions 52 extend along a turning path from horizontal at the respective inlet 46 to vertical at the respective filter 40. The airflow direction exiting the first portion 52 (i.e., at the filter 40 or entering the first turn 48) is at least 45° from an airflow direction at the inlet 46. The air tunnel 38 includes one or more walls 78 each partially constituting the respective first portion 52 and partially constituting the respective second portion 54. The walls 78 extend vertically to the respective first turns 48. Within each first portion 52, the wall 78 faces toward the inlet 46; i.e., each wall 78 is arranged so that air flowing into the respective inlet 46 will hit and be redirected by the wall 78.

Each filter 40 is positioned between the respective first portion 52 and the respective first turn 48. Each filter 40 is positioned above the respective inlet 46; an entirety of each filter 40 may be above a highest point of the respective inlet 46. The filters 40 may receive less moisture from the airflow through the filters 40 because of this location. Each filter 40 may be arranged to face downward, i.e., so that air flows vertically upward through the filter 40. Each filter 40 can extend fully across the respective branch 76, so that there is no airflow path through the branch 76 bypassing the filter 40. The filters 40 collectively can extend fully across the air tunnel 38, so that there is no airflow path through the air tunnel 38 bypassing the filters 40.

The filters 40 remove solid particulates such as dust, pollen, mold, dust, and bacteria from air flowing through the filters 40. The filters 40 may be any suitable type of filter, e.g., paper, foam, cotton, stainless steel, oil bath, etc.

The filters 40 can include hydrophobic fabrics 80. Each hydrophobic fabric 80 can extend fully across the respective branch 76, so that there is no airflow path through the branch 76 bypassing the hydrophobic fabric 80. The hydrophobic fabrics 80 collectively can extend fully across the air tunnel 38, so that there is no path for airflow through the air tunnel 38 bypassing the hydrophobic fabrics 80. The hydrophobic fabrics 80 repel water and can prevent at least some water from flowing therethrough.

The first drain 42 extends through the first portion 52 of the air tunnel 38. The first drain 42 is positioned to receive runoff from the wall 78; e.g., the first drain 42 is positioned at a base of the wall 78. The upward angle of the wall 78 in the first portion 52 can cause rain or moisture in the air to hit the wall 78 and flow downward to the first drain 42. Condensation can also occur as the path of airflow is directed upward by the first portion 52, and the condensed water can flow downward to the first drain 42.

The first turn 48 extends from the filter 40 to the second portion 54. An airflow direction exiting the first turn 48 is greater than 90° from an airflow direction entering the first turn 48. Airflow entering the first turn 48 is directed vertically upward, and airflow exiting the first turn 48 is directed vertically downward.

Each second portion 54 extends downward from the respective first turn 48 to the respective second turn 50. Each second portion 54 includes the respective wall 78.

Each second turn 50 extends from the respective second portion 54 to the respective third portion 56. An airflow direction exiting each second turn 50 is at least 45° from an airflow direction entering the second turn 50. Airflow entering each second turn 50 is directed vertically downward, and airflow exiting the second turn 50 is directed generally horizontally.

The third portion 56 extends from the second turns 50 to the blower 36. The third portion 56 includes a floor 82 and a back wall 84. The back wall 84 is positioned at an opposite end of the third portion 56 from the second turns 50. The floor 82 extends from the second turn 50 to the back wall 84 and forms a bottom surface of the third portion 56. The back wall 84 and the floor 82 meet at a rear edge 86. The floor 82 slopes downward from the second turn 50 to the rear edge 86; i.e., the rear edge 86 is at a lowest point of the floor 82.

The second drain 44 extends through the third portion 56 of the air tunnel 38. The second drain 44 is positioned to receive runoff from the back wall 84; e.g., the second drain 44 is positioned at the rear edge 86. The upward angle of the back wall 84 relative to the floor 82 can cause rain or moisture in the air to hit the back wall 84 and flow downward to the second drain 44. For example, back wall 84 can form an angle greater than 45°, e.g., approximately 90°, with the floor 82. Condensation can also occur as the path or airflow is directed upward by the back wall 84 from the third portion 56 to the blower 36, and the condensed water can flow downward to the second drain 44.

The blower 36 is fixed relative to the housing 34. The blower 36 is positioned to receive airflow from the air tunnel 38 and transmit airflow to the cavity 74 including the sensors 58. The blower 36 is positioned above the third portion 56 and is positioned to draw air vertically upward through the blower 36. The position of the blower 36 reduces a quantity of water in the air from entering the blower 36. The blower 36 may be any suitable device for pushing air, e.g., a fan, a pump, a compressor, etc.

The blower 36 includes a third drain 88 positioned to drain from an interior of the blower 36 through a blower housing 90 into the third portion 56. Centrifugal forces exerted by the blower 36 on air flowing through the blower 36 can force air against the blower housing 90, causing condensation. The condensation can flow downward along the blower housing 90 to the third drain 88. Water flowing through the third drain 88 can then flow, e.g., along the back wall 84 of the third portion 56, to the second drain 44 to exit the housing 34.

Figure 5:
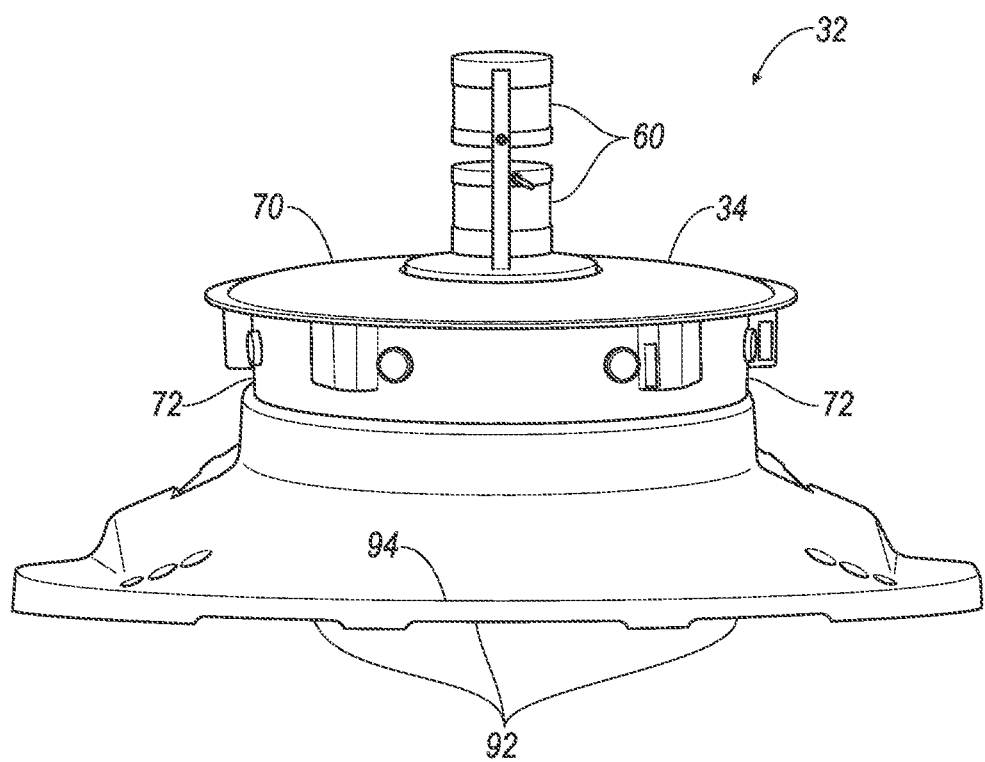
FIG. 5 is a rear view of the sensor assembly.

Forward motion of the vehicle 30 and/or the operation of the blower 36 generates airflow along paths through the air tunnel 38 from the inlets 46 to the blower 36 and then the cavity 74. At least some of the sensors 58 are positioned in the path of air flowing through the air tunnel 38 and the blower 36. The air exiting the blower housing 90 into the cavity 74 typically will have been dehumidified (i.e., contains a lower quantity of liquid water and/or water vapor than air entering the inlets 46) by the walls 78 of the first portions 52, by the filters 40, by back wall 84 of the third portion 56, and by the blower 36, before entering the cavity 74 containing the sensors 58. The water collected by the walls 78 and the filters 40 enters the first drains 42. The water collected by the blower 36 and the back wall 84 enters the second drain 44. The first drains 42 and the second drain 44 lead to an outlet 92 in a rear panel 94 of the housing 34 (shown in FIG. 5).

The disclosure has been described in an illustrative manner, and it is to be understood that the terminology which has been used is intended to be in the nature of words of description rather than of limitation. The adjectives "first," "second," and "third" are used throughout this document as identifiers and are not intended to signify importance or order. Many modifications and variations of the present disclosure are possible in light of the above teachings, and the disclosure may be practiced otherwise than as specifically described.

What is claimed is:

1. A sensor assembly comprising:
   a housing;
   a blower fixed relative to the housing;
   an air tunnel including an inlet, a first turn, a second turn, a first portion extending upward from the inlet to the first turn, a second portion extending downward from the first turn to the second turn, and a third portion extending from the second turn to the blower;
   a filter positioned between the first portion and the first turn;
   a first drain extending through the first portion; and
   a second drain extending through the third portion.

2. The sensor assembly of claim 1, wherein the blower is positioned above the third portion.

3. The sensor assembly of claim 1, further comprising a sensor disposed in the housing and positioned to receive airflow from the blower.

4. The sensor assembly of claim 1, wherein the air tunnel includes a wall partially constituting the first portion and partially constituting the second portion.

5. The sensor assembly of claim 4, wherein the first drain is positioned to receive runoff from the wall.

6. The sensor assembly of claim 1, wherein the third portion includes a floor extending from the second turn to a rear edge, and the second drain is positioned at the rear edge.

7. The sensor assembly of claim 6, wherein the floor slopes downward from the second turn to the rear edge.

8. The sensor assembly of claim 1, wherein the blower is positioned to draw air vertically upward through the blower.

9. The sensor assembly of claim 1, wherein the air tunnel is sealed from the inlet to the blower except for the first and second drains.

10. The sensor assembly of claim 1, wherein the filter is positioned above the inlet.

11. The sensor assembly of claim 1, wherein an airflow direction at the filter is at least 45° from an airflow direction at the inlet.

12. The sensor assembly of claim 1, wherein an airflow direction exiting the first turn is greater than 90° from an airflow direction entering the first turn.

13. The sensor assembly of claim 1, wherein an airflow direction exiting the second turn is at least 45° from an airflow direction entering the second turn.

14. The sensor assembly of claim 1, wherein the blower includes a third drain positioned to drain from an interior of the blower into the third portion.

15. The sensor assembly of claim 1, wherein the air tunnel is disposed inside the housing.

16. The sensor assembly of claim 1, wherein the inlet is open to an external environment.

17. The sensor assembly of claim 1, wherein the filter includes hydrophobic fabric.

* * * * *